(12) United States Patent
Schmidt

(10) Patent No.: US 11,555,525 B2
(45) Date of Patent: Jan. 17, 2023

(54) VIBRATION DAMPER HAVING AN ADJUSTABLE DAMPING FORCE

(71) Applicants: ThyssenKrupp Bilstein GmbH, Ennepetal (DE); thyssenkrupp AG, Essen (DE)

(72) Inventor: Klaus Schmidt, Odenthal (DE)

(73) Assignees: THYSSENKRUPP BILSTENN GMBH, Ennepetal (GE); THYSSENKRUPP AG, Esser (DE)

( * ) Notice: Subject to any disclaimer, the term of this patent is extended or adjusted under 35 U.S.C. 154(b) by 0 days.

(21) Appl. No.: 17/002,041

(22) Filed: Aug. 25, 2020

(65) Prior Publication Data
US 2021/0062887 A1 Mar. 4, 2021

(30) Foreign Application Priority Data
Aug. 28, 2019 (DE) ...................... 10 2019 212 908.0

(51) Int. Cl.
*F16F 9/32* (2006.01)
*F16F 9/18* (2006.01)
(Continued)

(52) U.S. Cl.
CPC ............ *F16F 9/3271* (2013.01); *F16F 9/185* (2013.01); *F16F 9/369* (2013.01); *F16F 9/50* (2013.01); *F16F 9/516* (2013.01); *F16F 2222/12* (2013.01); *F16F 2224/02* (2013.01); *F16F 2228/066* (2013.01); (Continued)

(58) Field of Classification Search
CPC .......... F16F 9/3271; F16F 9/185; F16F 9/369; F16F 9/50; F16F 9/516; F16F 2222/12; F16F 2224/02; F16F 2228/066; F16F 2230/0005; F16F 2230/0052; F16F 2230/30; F16F 2232/08; F16F 2234/02
See application file for complete search history.

(56) References Cited

U.S. PATENT DOCUMENTS 4,044,865 A * 8/1977 Tourunen ................ B21B 21/04
188/287
4,872,516 A * 10/1989 MacFarlane ............ E21B 4/145
173/206
(Continued)

FOREIGN PATENT DOCUMENTS

CN 108087481 A 5/2018
CN 108999915 A 12/2018
(Continued)

*Primary Examiner* — Robert A. Siconolfi
*Assistant Examiner* — James K Hsiao
(74) *Attorney, Agent, or Firm* — thyssenkrupp North America, LLC

(57) ABSTRACT

A vibration damper with an adjustable damping force may comprise an inner cylinder having at least one working chamber, an outer cylinder that surrounds the inner cylinder, and at least one damping valve element that in terms of flow is connected via a flow connection to the working chamber. An adapter sleeve may guide the flow connection, with the adapter sleeve being inserted in the inner cylinder on an internal circumference of the inner cylinder. The flow connection may be guided into the damping valve element by way of a flow opening that is configured in a wall of the inner cylinder.

16 Claims, 2 Drawing Sheets

(51) Int. Cl.
  *F16F 9/36* (2006.01)
  *F16F 9/50* (2006.01)
  *F16F 9/516* (2006.01)

(52) U.S. Cl.
  CPC .............. *F16F 2230/0005* (2013.01); *F16F 2230/0052* (2013.01); *F16F 2230/30* (2013.01); *F16F 2232/08* (2013.01); *F16F 2234/02* (2013.01)

(56) References Cited

U.S. PATENT DOCUMENTS

| | | | | |
|---|---|---|---|---|
| 5,586,627 A * | 12/1996 | Nezu | ................ | B60G 17/08 188/266.6 |
| 5,649,611 A | 7/1997 | Nakadate et al. | | |
| 5,924,528 A * | 7/1999 | Vermolen | ................ | F16F 9/46 188/266.1 |
| 6,079,526 A * | 6/2000 | Nezu | ................ | F16F 9/46 188/266.6 |
| 6,182,805 B1 * | 2/2001 | Kashiwagi | ................ | F16F 9/325 188/266.6 |
| 6,283,259 B1 * | 9/2001 | Nakadate | ................ | F16F 9/369 188/322.2 |
| 6,321,888 B1 * | 11/2001 | Reybrouck | ................ | F16F 9/325 188/299.1 |
| 6,464,048 B1 * | 10/2002 | Groves | ................ | F16F 9/06 188/266.6 |
| 6,494,441 B2 * | 12/2002 | Beck | ................ | B60G 17/0416 267/64.16 |
| 7,255,210 B2 * | 8/2007 | Larsson | ................ | F16F 9/342 188/280 |
| 7,441,638 B2 * | 10/2008 | Hanawa | ................ | B62K 25/08 188/314 |
| 7,828,307 B2 * | 11/2010 | Ersoy | ................ | B60G 21/0553 280/124.107 |
| 7,950,506 B2 * | 5/2011 | Nowaczyk | ................ | F16F 9/466 188/266.6 |
| 8,511,447 B2 * | 8/2013 | Nowaczyk | ................ | F16F 9/325 188/315 |
| 9,114,846 B1 * | 8/2015 | Ishikawa | ................ | F16F 9/56 |
| 9,682,602 B2 * | 6/2017 | Morita | ................ | B60G 17/015 |
| 11,118,649 B2 * | 9/2021 | Deferme | ................ | F16F 9/3257 |
| 2004/0134730 A1 | 7/2004 | Forster | | |
| 2012/0175830 A1 * | 7/2012 | Yang | ................ | F16F 9/516 267/140.13 |
| 2015/0191069 A1 * | 7/2015 | Zuleger | ................ | F16F 9/465 280/124.16 |
| 2016/0061283 A1 * | 3/2016 | Yamashita | ................ | F16F 9/369 188/313 |
| 2016/0160955 A1 * | 6/2016 | Yu | ................ | F16F 9/062 188/269 |
| 2016/0265614 A1 * | 9/2016 | Ripa | ................ | F16F 9/512 |
| 2017/0058988 A1 * | 3/2017 | Manger | ................ | F16F 9/34 |
| 2018/0245660 A1 * | 8/2018 | Yamashita | ................ | F16F 9/18 |
| 2018/0355940 A1 * | 12/2018 | Manger | ................ | F16F 9/369 |
| 2019/0136932 A1 * | 5/2019 | Deferme | ................ | F16F 9/185 |
| 2019/0136935 A1 * | 5/2019 | Hulstein | ................ | F16F 9/446 |
| 2020/0141468 A1 * | 5/2020 | Maeda | ................ | F16F 9/185 |
| 2020/0173513 A1 | 6/2020 | Woenarta | | |
| 2021/0164533 A1 | 6/2021 | Zeissner et al. | | |

FOREIGN PATENT DOCUMENTS

| | | |
|---|---|---|
| CN | 208935250 U | 6/2019 |
| DE | 44 06 350 A1 | 9/1995 |
| DE | 102 60 394 B | 6/2004 |
| DE | 10 2005 053 394 A | 5/2006 |
| DE | 10 2017 222 232 A | 6/2019 |
| DE | 10 2018 220 630 A | 6/2020 |
| KR | 20050092871 A | 9/2005 |
| WO | 2019/110226 A1 | 6/2019 |

* cited by examiner

VIBRATION DAMPER HAVING AN ADJUSTABLE DAMPING FORCE

CROSS REFERENCE TO RELATED APPLICATION

This application is a U.S. Non-Provisional Application claiming priority to German Patent Application No. DE 10 2019 212 908.0, filed Aug. 28, 2019, the entire content which is incorporated herein by reference.

FIELD

The present disclosure generally relates to vibration dampers, including vibration dampers that have an adjustable damping force.

BACKGROUND

In a triple-tube vibration damper having an adjustable damping valve element which is attached externally to the outer cylinder, a difficulty often lies in fluidically linking the damping valve element to the inner cylinder. To this end, DE 10 2005 053 394 A1 shows a tubular port which surrounds the inner cylinder and to which the damping valve element is connected, for example. DE 10 2017 222 232 A1 achieves the linking of the damping valve element to the inner cylinder by way of a separate adapter sleeve which in terms of length extends the inner cylinder downwards in the axial direction and which, conjointly with the tubular piece of the inner cylinder, by way of the base valve is braced in relation to the outer cylinder. Both solutions require a very precise fit in production and subsequently accurate assembling of the components.

Thus a need exists for a vibration damper having a damping valve element, in which the damping valve element is linked to the inner cylinder in such a manner that less stringent tolerances in terms of production and fit are sufficient.

DETAILED DESCRIPTION

Figure 1:
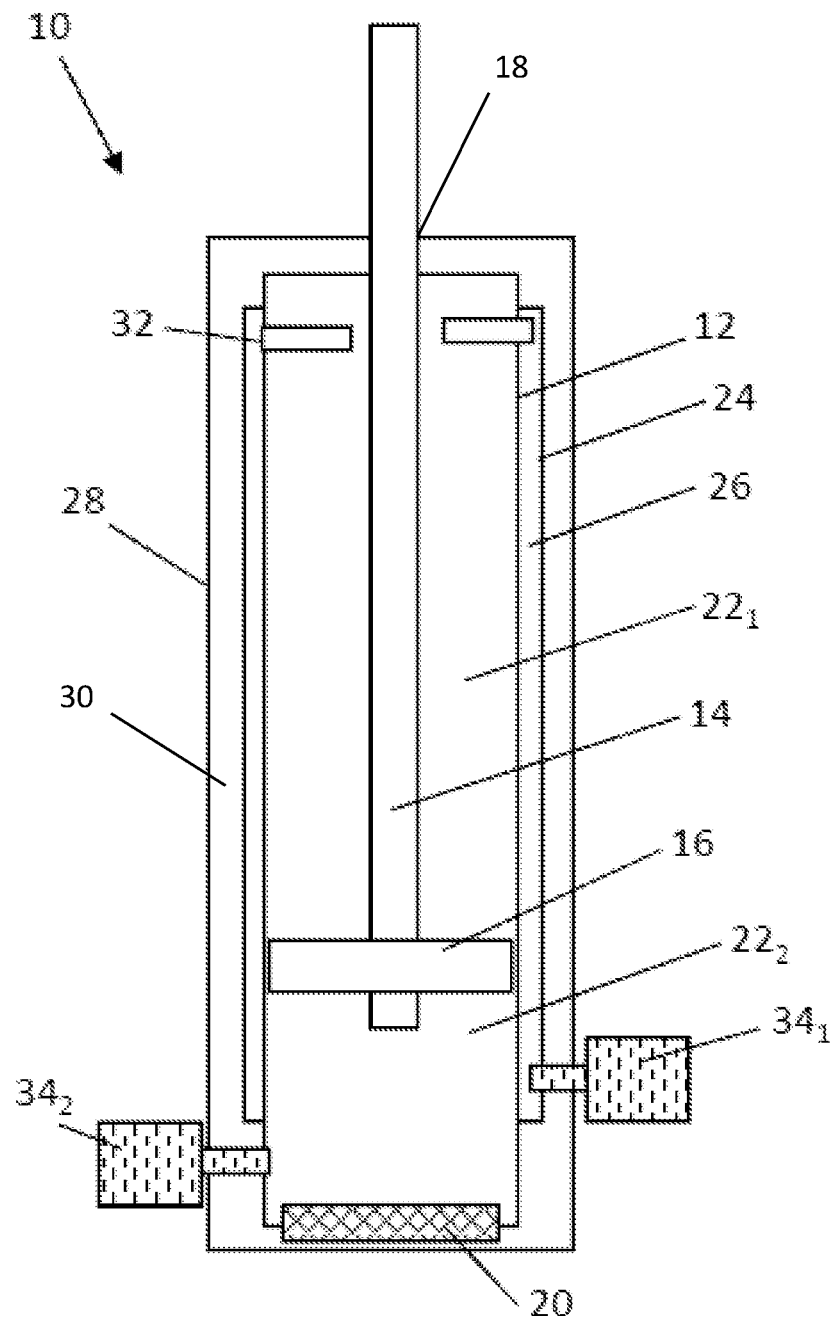
FIG. 1 is a schematic view of an example triple-tube vibration damper having an adjustable damping force.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to vibration dampers having an adjustable damping force. Some example vibration dampers may comprise an inner cylinder having at least one working chamber, an outer cylinder that surrounds the inner cylinder, and at least one damping valve element that in terms of flow is connected to the working chamber.

In some examples, a vibration damper with an adjustable damping force may comprise an inner cylinder having at least one working chamber, an outer cylinder that surrounds the inner cylinder, and a damping valve element disposed on the outer cylinder and in terms of flow is connected to the inner cylinder. The flow connection may be guided by way of an adapter sleeve which is inserted in the inner cylinder on the internal circumference of the latter.

The term "inserted in the inner cylinder on the internal circumference of the latter" herein means that the adapter sleeve is pushed completely into the inner cylinder during the assembly procedure. The vibration damper according to the invention thus differs from solutions of the prior art in that bracing of the inner cylinder within the outer cylinder, between the piston rod guide situated at the top and the base valve, takes place according to the invention. The adapter sleeve does not participate in this chain of bracing. In order for the adapter sleeve to be inserted into the inner cylinder, it is consequently sufficient for a loose fit to be provided between the sleeve and the cylinder such that the complexity in terms of production and assembly can be reduced. Furthermore, the adapter sleeve in the region of the flow connection can be designed so as to extend, or be continuous, respectively, in such a manner that no constrictions in terms of flow are created and no foaming of the damping means can arise during the operation.

One advantageous design embodiment of the invention provides that the flow connection is guided into the damping valve unit by way of a flow opening which is configured in a wall of the inner cylinder. There are also no particular geometric requirements set for the flow opening since only a fluidic connection to the damping valve has to be ensured by way of said flow opening. In a specific design embodiment it can be provided that the flow connection is guided by way of a connector port from the adapter sleeve to the damping valve element, said connector port being inserted in the flow opening. The connector port herein can be expediently utilized for holding the adapter sleeve relative to the inner cylinder in a longitudinal direction. This once again simplifies the design embodiment of the adapter sleeve since no particular measures have to be taken for said adapter sleeve in order for the latter to be established in the longitudinal direction within the inner cylinder.

One advantageous design embodiment of the invention provides that the connector port in a sealing manner is inserted in a bore which is configured in a circumferential wall of the adapter sleeve. On account thereof, the adapter sleeve and the connector port become one unit in which the flow connection from the inner cylinder into the damping valve is guided. In order for the flow connection to be sealed, the connector port is sealed in relation to the adapter sleeve by way of an annular seal. In a specific design embodiment it can furthermore be provided that the adapter sleeve on each axial end thereof is sealed in relation to an internal face of the inner cylinder by way of an annular seal. Standardized annular seals, also referred to as O-rings, can expediently be used for sealing between the adapter sleeve and the internal face of the cylinder. To this end, the adapter sleeve can have in each case encircling receptacle grooves into which the respective annular seal is inserted.

One advantageous design embodiment of the invention provides that at least one further bore for inserting a further connector port is configured in the circumferential wall of the adapter sleeve. On account thereof, there is the possibility of connecting even further components to the working chamber of the inner cylinder.

One advantageous design embodiment of the invention provides that the adapter sleeve is positioned in the inner cylinder so as to be displaceable in a longitudinal direction of the latter. This means in particular a facilitation with a view to the assembly process since the adapter sleeve initially does not have to be positioned exactly in a longitudinal position; rather it is sufficient for a final longitudinal positioning to take place only shortly before the connector port is assembled.

Since the adapter sleeve is not a load-bearing component, or a structurally stressed component, respectively, the adapter sleeve can be embodied as a plastics material component.

FIG. 1 shows a vibration damper 10 having an adjustable damping force in a sectional and schematic illustration. The vibration damper 10 comprises an inner cylinder 12 which is filled with a damping means and in which a piston 16 attached to a piston rod 14 is guided so as to be axially movable. The direction of movement of the piston 16 can be defined as a longitudinal direction of the vibration damper 10. The upper end of the cylinder 12 is closed by a piston rod guide 18, and the lower end of the cylinder 12 is closed by a base 20 which may be configured as a base valve body. A working chamber 22 is formed in the inner cylinder 12. The piston divides the working chamber 22 into a piston-rod-proximal working chamber $22_1$ and a piston-rod-distal working chamber $22_2$. An intermediate tube 24 is disposed circumferentially about the inner cylinder 12 such that the cylinder 12 and the intermediate tube 24 form an annular space 26. Openings 32 by way of which the damping means can overflow from the inner cylinder 12 into the annular space 26 are configured in the wall of the inner cylinder 12.

The inner cylinder 12 and the intermediate tube 24 are conjointly encased by an outer cylinder 28 such that a further annular space 30 is formed between the outer cylinder 28 and the inner cylinder 12, or the intermediate tube 24, respectively.

The vibration damper 10 can furthermore possess two in each case adjustable damping valve elements $34_1$, $34_2$. The damping valve elements $34_1$, $34_2$ for in each case one of the piston movements can be operatively connected to the piston-rod-proximal working chamber $22_1$ and the piston-rod-distal working chamber $22_2$. The damping valve elements $34_1$, $34_2$ can be held on the outer cylinder 28. The damping valve element $34_1$ serves for damping the deployment movement of the piston rod 14, or of the piston 16, respectively, in the rebound stage, and the damping valve element $34_2$ serves for damping the retraction movement of the piston rod 14, or of the piston 16, in the pressure stage of the vibration damper 10.

In a deployment movement of the piston rod 14, or of the piston 16, respectively, the damping means by way of the openings 32 and the annular space 26 is conveyed from the piston-rod-proximal working chamber $22_1$ into the associated damping valve element $34_1$, and by way of the outflow side of the damping valve element $34_1$ is conveyed into the outer annular space 30. In a retraction movement of the piston rod 14, or of the piston 16, respectively, the damping means is conveyed from the piston-rod-distal working chamber $22_2$ directly into the associated damping valve element $34_2$, and by way of the outflow side of the damping valve element $34_2$ is conveyed into the outer annular space 30. An overflow of damping means from the annular space 30 through overflow bores in the piston 16 into the piston-rod-proximal working chamber $22_1$ takes place in parallel. The damping valve elements $34_1$, $34_2$, according to their assignment, in terms of flow are consequently connected either to the piston-rod-proximal working chamber $22_1$ or the piston-rod-distal working chamber $22_2$.

Figure 2:
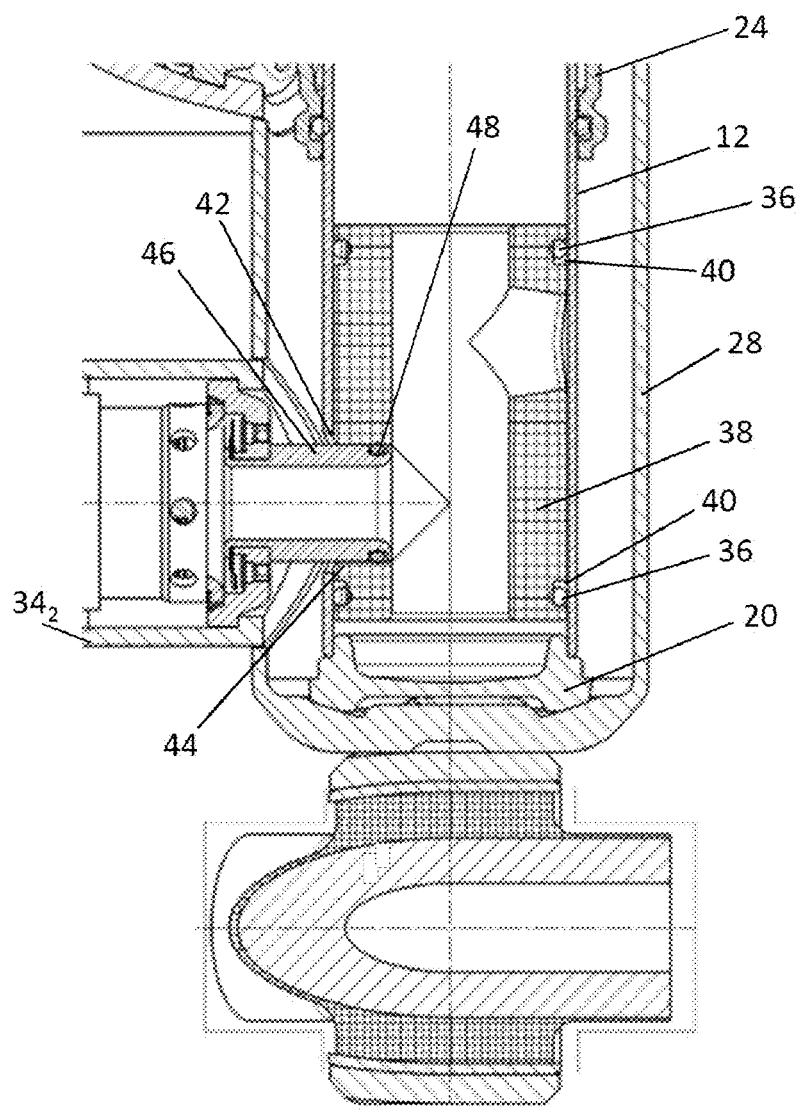
FIG. 2 is a detail view of a lower region of an example vibration damper, which has a damping valve element linked.

FIG. 2 shows a detailed illustration of the lower region of a vibration damper 10, having the damping valve element $34_2$ of the pressure stage being linked to the inner cylinder 12 according to the invention. To this end, the flow connection from the inner cylinder 12, or the piston-rod-distal working chamber $22_2$, respectively, into the damping valve element $34_2$ is guided by way of an adapter sleeve 38 which is inserted in the inner cylinder 12 so as to be on the internal circumference of the latter. It is in particular provided that the adapter sleeve 38 is completely introduced into the inner cylinder 12 and in the axial direction is preferably set at a clearance from the base valve body 20. This axial clearance from the base valve body 20 is advantageous to the extent that no unequivocal axial assembly position has to be provided for the adapter sleeve 38, the adapter sleeve 38 during the assembly procedure rather being able to slide in a self-acting manner to the final axial position.

The adapter sleeve 38 on both axial end regions is sealed in relation to an internal circumferential face of the inner cylinder 12 by way of a respective annular seal 36 which sits in a circumferential groove 40.

The flow connection from the inner cylinder 12 into the damping valve element $34_2$ is furthermore guided by way of a flow opening 42 which is configured in a wall of the inner cylinder 12. In the design embodiment presently shown, a connector port 46 herein is inserted into the flow opening 42 and into a bore 44 which is configured in a circumferential wall of the adapter sleeve 38. The connector port 46 is inserted in the bore 44 so as to be sealed by way of an annular seal 48 and thus sealed in relation to the adapter sleeve 38.

The linking of the damping valve element $34_2$ of the pressure stage to the inner cylinder 12 according to the invention is advantageous in particular with a view to assembling the vibration damper 10 since no unequivocal axial and circumferential assembly position has to be initially provided for pushing the adapter sleeve 38 into the inner cylinder 12. In terms of the assembly of the adapter sleeve 38 it is considered entirely sufficient for the adapter sleeve 38 to be initially only positioned in a preliminary manner in the axial direction and in terms of the circumferential position of said adapter sleeve 38 such that the bore 44 in the adapter sleeve and the flow opening 42 in the inner cylinder 12 are brought to be only partially congruent.

LIST OF REFERENCE SIGNS

10 Vibration damper
12 Cylinder
14 Piston rod
16 Piston
18 Piston rod guide
20 Base
22 Working chamber
24 Intermediate tube
26 Annular space
28 Cylinder
30 Annular space
32 Opening 34 Damping valve element
36 Annular seal
38 Adapter sleeve
40 Circumferential groove
42 Flow opening
44 Bore
46 Connector port
48 Annular seal

What is claimed is:

1. A vibration damper having an adjustable damping force, the vibration damper comprising:
an inner cylinder having a working chamber;
an outer cylinder that surrounds the inner cylinder;
a damping valve element disposed on the outer cylinder, wherein with respect to flow the damping valve element is fluidically connected to the inner cylinder; and
an adapter sleeve that guides the flow of damping fluid between the inner cylinder and the damping valve element, with an entirety of the adapter sleeve being inserted radially within the inner cylinder on an internal circumference of the inner cylinder,
wherein damping fluid is guided into the damping valve element by way of a flow opening that is configured in a wall of the inner cylinder,
wherein damping fluid is guided by way of a connector port from the adapter sleeve to the damping valve element, the connector port being inserted in the flow opening,
wherein the connector port in a sealing manner is inserted in a bore configured in a circumferential wall of the adapter sleeve.

2. The vibration damper of claim 1 wherein the connector port is sealed relative to the adapter sleeve by way of an annular sleeve.

3. The vibration damper of claim 1 wherein the bore is a first bore and the connector port is a first connector port, the vibration damper comprising a second bore for inserting a second connector port, wherein the second bore is configured in the circumferential wall of the adapter sleeve.

4. The vibration damper of claim 1 wherein each axial end of the adapter sleeve is sealed relative to an internal face of the inner cylinder by way of an annular seal.

5. The vibration damper of claim 1 wherein the adapter sleeve and the inner cylinder are sized and shaped such that an inner cylindrical surface of the inner cylinder does not restrict movement of the adapter sleeve in the longitudinal direction of the inner cylinder.

6. The vibration damper of claim 1 wherein the adapter sleeve is comprised of plastic.

7. The vibration damper of claim 1 wherein the entirety of the adapter sleeve is inserted radially within the inner cylinder such that no portion of the adapter sleeve protrudes radially outward of any portion of the inner cylinder.

8. The vibration damper of claim 1 wherein for a full longitudinal extent of the adapter sleeve an outer diameter of the adapter sleeve is smaller than an inner diameter of the inner cylinder.

9. The vibration damper of claim 1 wherein the inner cylinder is a single-piece construction.

10. A vibration damper having an adjustable damping force, the vibration damper comprising:
an inner cylinder having a working chamber;
a working piston disposed within the inner cylinder and abutting an inner cylindrical surface of the inner cylinder;
an outer cylinder that surrounds the inner cylinder;
a damping valve element disposed on the outer cylinder, wherein with respect to flow the damping valve element is fluidically connected to the inner cylinder;
an adapter sleeve that guides the flow of damping fluid between the inner cylinder and the damping valve, the adapter sleeve being disposed in the inner cylinder on an internal circumference of the inner cylinder; and
openings at an end of the inner cylinder that connect to an annular space located between the inner cylinder and a tube that is disposed circumferentially about the inner cylinder.

11. The vibration damper of claim 10 wherein the adapter sleeve is disposed completely radially within the inner cylinder.

12. The vibration damper of claim 10 wherein the inner cylinder is a single-piece construction.

13. The vibration damper of claim 10 wherein each axial end of the adapter sleeve is sealed relative to an internal face of the inner cylinder by way of an annular seal.

14. A vibration damper having an adjustable damping force, the vibration damper comprising:
an inner cylinder having a working chamber, with the inner cylinder extending along a longitudinal axis;
a base valve body disposed on an axial end face of the inner cylinder, wherein the base valve body includes an annular rim that extends into the inner cylinder and mates with an inner cylindrical surface of the inner cylinder;
an outer cylinder that surrounds the inner cylinder;
a damping valve element disposed on the outer cylinder, wherein with respect to flow the damping valve element is fluidically connected to the inner cylinder; and
an adapter sleeve that guides the flow of damping fluid between the damping valve element and the inner cylinder, the adapter sleeve being disposed in the inner cylinder on an internal circumference of the inner cylinder, wherein the adapter sleeve is disposed at a longitudinal end of the inner cylinder where the base valve body is located and is longitudinally spaced apart from the base valve body.

15. The vibration damper of claim 14 wherein the inner cylinder is a single-piece construction, wherein the adapter sleeve is disposed completely radially within the inner cylinder.

16. The vibration damper of claim 14 comprising a working piston that is disposed within the inner cylinder and abuts the inner cylindrical surface of the inner cylinder.

* * * * *